Sept. 1, 1925.  
V. BENDIX  
1,551,787  
ENGINE STARTER  
Filed Aug. 13, 1917
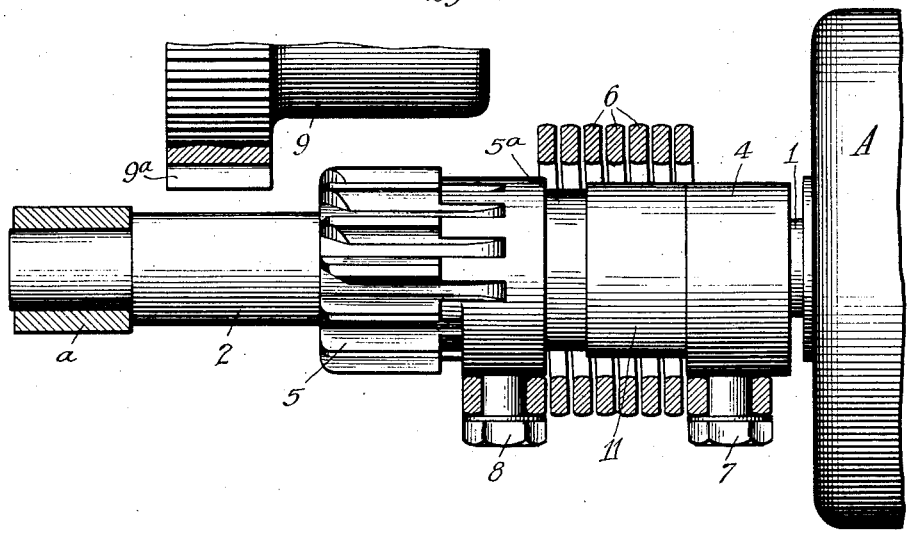
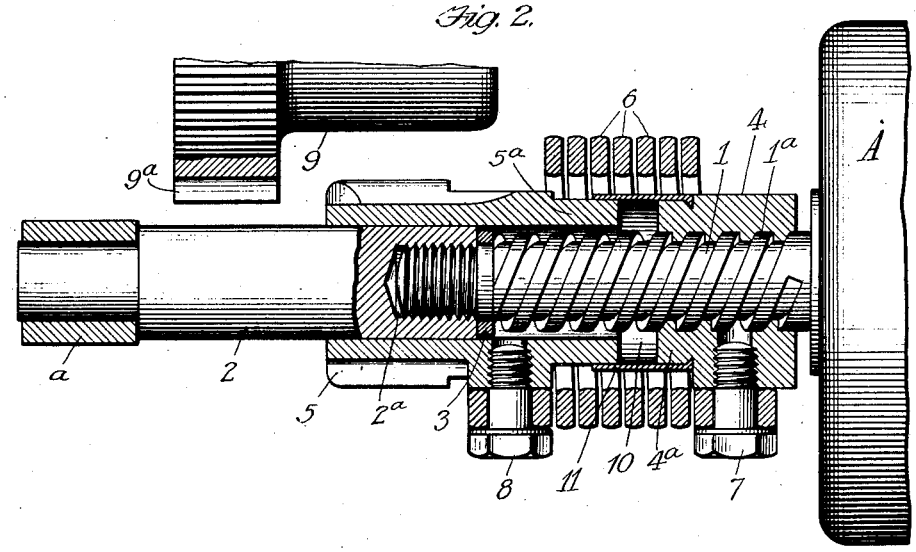

Patented Sept. 1, 1925.

UNITED STATES PATENT OFFICE.

VINCENT BENDIX, OF CHICAGO, ILLINOIS.

ENGINE STARTER.

Application filed August 13, 1917. Serial No. 185,873.

*To all whom it may concern:*

Be it known that I, VINCENT BENDIX, a citizen of the United States, residing at Chicago, Cook County, Illinois, have invented certain new and useful Improvements in Engine Starters, of which the following is a specification.

My invention relates to that type of engine starter and to the transmission or drive portion thereof as exemplified in patents heretofore issued to me, for instance, Patent No. 1,172,864, dated February 22, 1916, which starter is characterized by a prime mover such as an electric motor and a transmission or drive connected therewith either directly or indirectly for transmitting the power of the motor by means of a rotatable shaft such as a screw shaft and a member mounted thereon, such as a pinion, adapted to operatively engage a part of the engine to be started, such as the fly wheel thereof.

The object of my present invention is to produce a drive of this type but of somewhat different construction and made efficient and compact and providing a pinion of comparatively small diameter.

In the drawing Fig. 1 is an elevation; and Fig. 2 is sectional elevation of a drive embodying my invention and illustrating a portion of the fly wheel of the engine and of the starting motor.

Referring to the embodiment of my invention as herein shown the starting motor, indicated at A, is provided with an extended armature shaft which may be considered the driving shaft and here shown as made in two separate detachable parts connected directly with the drive or transmission about to be described. In the present instance the inner part of this driving shaft is a screw shaft 1 and the outer part a plain shaft 2, which is secured in suitable manner to the outer end of the screw shaft as by means of a screw-threaded portion of the latter screwing into the end bore 2ª of the plain shaft. By preference a suitable hardened washer 3 is interposed between an intermediate shoulder at the end of the screw threads of the screw shaft and the inner end of the plain shaft, to act as a stop for the screw member in its longitudinal movement on the screw shaft towards the left. In the broader aspect of my invention the driving shaft may be made in one piece but by preference it is made as shown.

The screw shaft is provided with a screw-threaded portion 1ª extending nearly to the motor casing and on these threads is mounted, by being screw-threaded thereon a screw member 4, which is capable of longitudinal and rotary movement with respect to the screw shaft and also rotary movement therewith. As shown, the screw-threads are abruptly stopped at their inner ends to form stops for the inward travel of the screw member. At the outer end of its limit of travel such screw member is stopped by the washer 3.

The screw member is operatively connected to and controls the movements of a driving member or pinion 5 through suitable driving means which is here shown as a yielding driving connection in the form of a coiled spring 6 connected respectively to the screw member and driving member. One end of the spring is anchored to a stud 7 screwing into the screw member and at the other end to a stud 8 screwing into the driving member.

The driving member 5 has teeth at its inner end adapted to mesh with the teeth 9ª of the fly wheel 9 of the engine to be started. This driving member which is mounted upon the plain shaft 2 is capable of both longitudinal and rotary movement with respect to the driving shaft and also rotary movement therewith and is controlled by the screw member, so that it partakes of substantially the same movements thereon.

The outer portion of the driving member is formed as a cylindrical extension or hub 5ª between which and a similar hub 4ª on the screw member is a clearance or compression space 10, with the result that in the event that the pinion teeth should abut the fly-wheel teeth end to end, the pinion will yield outwardly longitudinally with respect to the screw member as permitted by the spring coils. In order to bridge this space and prevent the possibility of a coil dropping or wedging thereinto, when such spring is wound or under tension during the driving operation or by reason of back fires of the engine, suitable means are provided, such as a sleeve 11 secured to the hub 4ª and having a sliding fit upon the hub 5ª.

Describing the operation of the drive, and starting with the parts in their normal position shown, the rotation of the driving shaft by the rotation of the electric motor causes the screw member 4 to move inwardly longitudinally, that is, towards the left in Fig. 1, carrying with it the driving member 5 and causing the latter to mesh with the fly-wheel. When the screw-member contacts the washer 3 it is at its limit of travel in this direction and thereupon such screw-member and consequently the pinion or driving member will be rotated, thereby driving the fly-wheel. The power is transmitted from the screw member to the pinion through the coiled spring 6. When the engine has started on its own power, the accelerated movement of its fly-wheel will automatically demesh the driving member and cause the same to be moved back to normal or home position through the control thereof by the screw member. The movement of the screw member in this direction is limited by the end of the screw threads on the screw shaft. The driving shaft may or may not be provided with a bearing at its outer end. In the present instance it is shown as having a bearing *a* at such end, but this is not essential.

I claim:

1. A drive for engine starters comprising a rotatable driving shaft driven at one end and having a screw threaded portion at such end, the other portion being plain, and a driving member mounted on the plain portion of the shaft and operatively connected with the screw threaded portion thereof.

2. A drive for engine starters comprising a rotatable driving shaft driven at one end and having a screw threaded portion at such end, the other portion being plain, and a driving member mounted on such plain portion of the shaft for longitudinal movement thereof and rotary movement therewith, said member being operatively connected with the screw threaded portion of the shaft.

3. A drive for engine starters comprising a rotatable driving shaft driven at one end and having a screw-threaded portion at such end, the other portion being plain, and a pinion mounted to slide longitudinally on such plain portion of the shaft and to rotate therewith, said pinion being operatively connected with the screw threaded portion of the shaft.

4. A drive for engine starters comprising a rotatable driving shaft driven at one end and made in two parts detachably connected together in alinement, the part at the driven end being a screw shaft and the other a plain shaft, and a driving member mounted on the driving shaft and actuated by the screw threaded portion thereof.

5. A drive for engine starters comprising a rotatable driving shaft driven at one end and having a screw threaded portion at such end, the other portion being plain, a screw member mounted on the screw shaft, a driving member mounted on the shaft to move longitudinally thereof and rotarily therewith, and a driving means between the two members.

6. A drive for engine starters comprising a rotatable driving shaft driven at one end and having a screw threaded portion at such end, the other portion being plain, a screw member mounted on the screw shaft, a driving member mounted on the shaft to move longitudinally thereof and rotarily therewith, and a yielding driving means between the two members.

7. A drive for engine starters comprising a rotatable driving shaft driven at one end and having a screw threaded portion at such end, the other portion being plain, a screw member mounted on the screw shaft, a driving member mounted on the shaft to move longitudinally thereof and rotarily therewith, and a spring acting as a yielding driving means between the two members.

8. In combination with an electric motor having its armature shaft extended and screw threaded, a plain shaft secured to the outer end of such armature shaft, a driving member mounted on the plain shaft for longitudinal movement thereof and rotary movement therewith, and a screw member mounted on the screw shaft and operatively connected with the driving member.

VINCENT BENDIX.